J. H. MOTT.
STRAW SPREADER.
APPLICATION FILED DEC. 13, 1911.

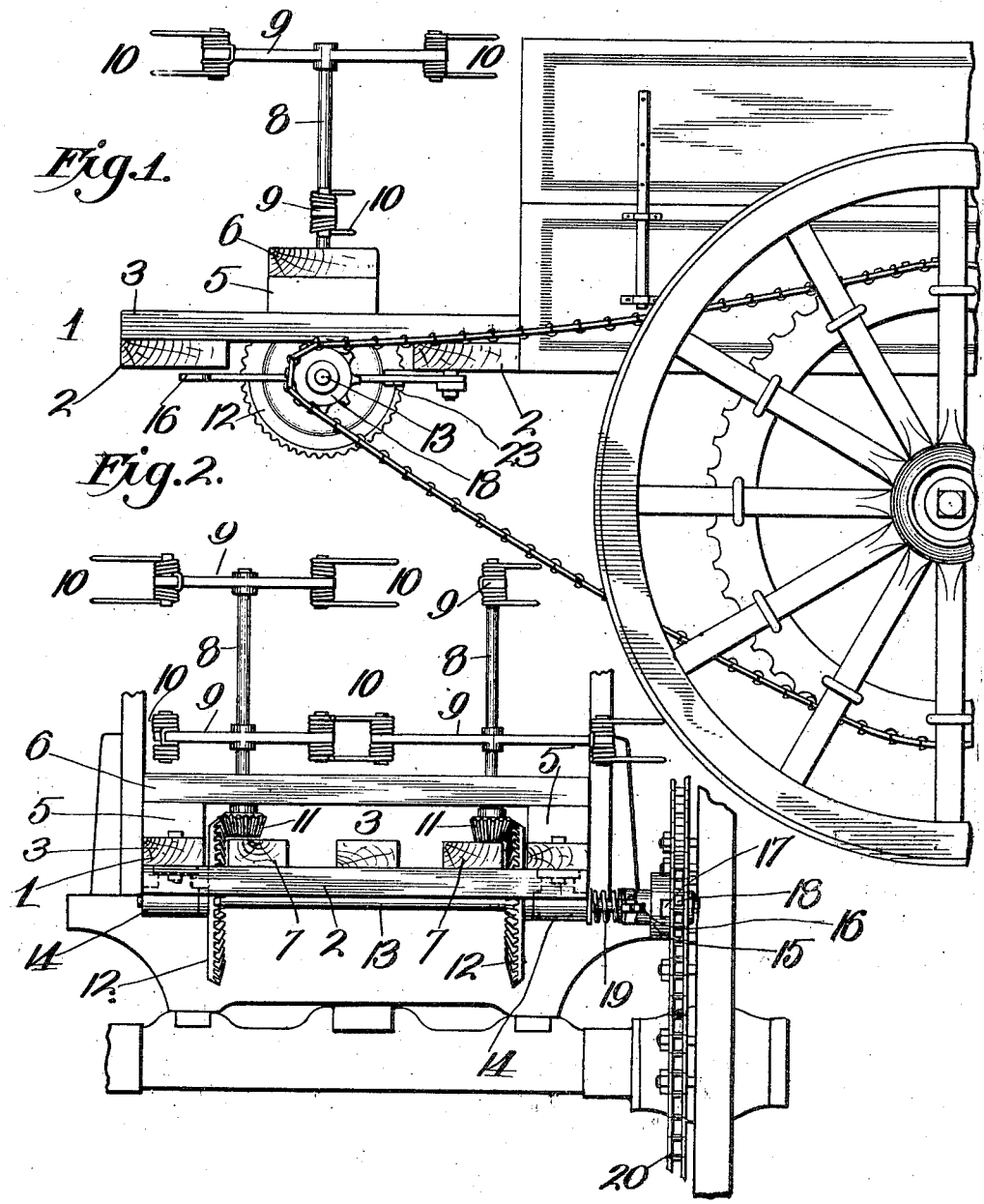

1,037,038.

Patented Aug. 27, 1912.

2 SHEETS—SHEET 2.

Witnesses
Frank R. Glon
H. C. Rodgers

Inventor
J. H. Mott
By George H. Thorpe Atty.

UNITED STATES PATENT OFFICE.

JAMES H. MOTT, OF EMMETT TOWNSHIP, CALHOUN COUNTY, MICHIGAN, ASSIGNOR TO SIMPLEX SPREADER MANUFACTURING COMPANY, OF KANSAS CITY, MISSOURI.

STRAW-SPREADER.

1,037,038.  Specification of Letters Patent.  Patented Aug. 27, 1912.

Application filed December 13, 1911. Serial No. 665,562.

*To all whom it may concern:*

Be it known that I, JAMES H. MOTT, a citizen of the United States, residing in Emmett township, in the county of Calhoun and State of Michigan, have invented certain new and useful Improvements in Straw-Spreaders, of which the following is a specification.

This invention relates to straw spreaders and more especially to straw spreading attachments for wagons or other wheeled vehicles, and my object is to produce an attachment of this character which will perform its proper function efficiently and which can be easily and quickly secured in or removed from operative position.

To this end the invention consists in certain novel and peculiar features of construction and organization as hereinafter described and claimed; and in order that it may be fully understood reference is to be had to the accompanying drawings, in which:—

Figure 3:
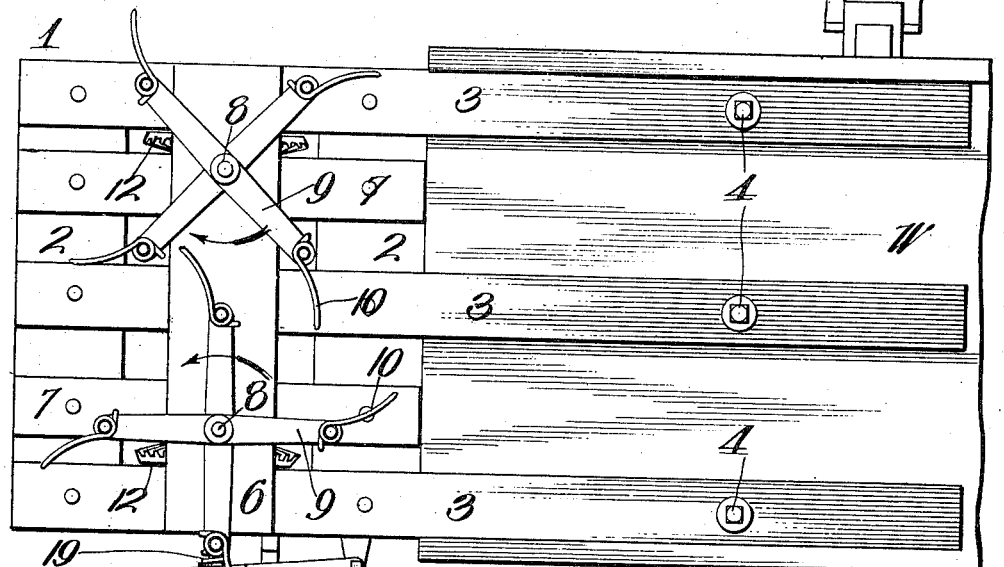
Figure 4:
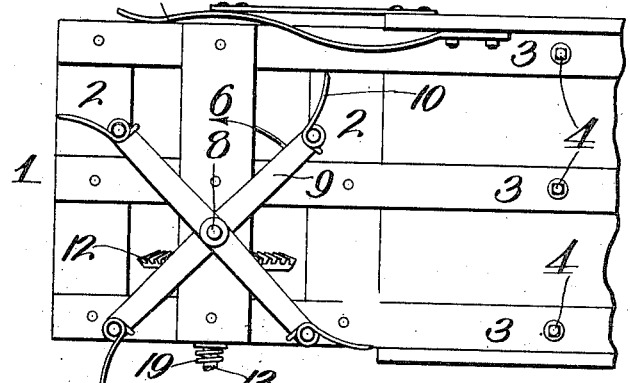

Figure 1, is a side view of a portion of a wagon equipped with a straw spreading attachment embodying my invention. Fig. 2, is a fragmentary rear view of the construction shown by Fig. 1. Fig. 3, is a plan view. Fig. 4, is a plan view of a modified form of the straw spreading attachment.

In the said drawings, 1 is a frame constructed as follows: 2 is a pair of parallel cross bars connected by a plurality of longitudinally extending bars 3, which project a considerable distance beyond the foremost cross bar 2, and the bars are so proportioned that the front cross bar 2 may bear against the rear end of the bottom of the wagon W, or other vehicle, and the bars 3 extend into the wagon body and rest upon the bottom thereof with the outermost bars 3 preferably engaging the sides of the wagon body. To secure the frame rigidly in position, the forwardly extending portions of the bars 3, are bolted at 4 to the bottom of the wagon.

5 is a pair of blocks secured upon the outermost bars 3, and connecting said blocks is a cross bar 6. Connecting the bars 2 inward of the planes of the blocks 5, is a pair of bars 7 forming journals for the lower ends of a pair of vertical shafts 8 also journaled in cross bar 6. Each shaft 8 is provided with one or more radial arms 9, and each arm 9 is equipped at its end with a horizontally arranged fork 10, the same being preferably made of wire. The shafts are provided near their lower ends with bevel gears 11, meshing with larger gears 12 secured on a transverse shaft 13 journaled in bearings 14, depending from the outermost bars 3 centrally between cross bars 2.

15 is a clutch member arranged to slide upon and rotate with shaft 13, and connected in any suitable manner to the hand lever 16 fulcrumed on frame 1, so that it may be withdrawn from engagement with the companion clutch 17, the latter being in the form of a sprocket wheel 18 journaled on the outer end of shaft 13. A spring 19 is preferably employed for holding the slidable clutch member 15 in engagement with the journaled clutch member 17. To impart rotation to the shaft when the clutch members are in engagement, the sprocket wheel 18 is connected by a sprocket chain 20 with a sprocket wheel 21 secured to the inner side of one of the wheels of the wagon W.

In practice, a wagon loaded with straw and equipped with my attachment at the rear end, is driven over the field upon which the straw is to be distributed and through the gearing described, the vertical shafts 8 are operated in the direction indicated by the adjacent arrows, Fig. 3. Any suitable means may be employed to feed the straw from the wagon within the range of movement of the forks, though ordinarily a man will perform this function with a pitchfork. The straw will be carried rearwardly between the rapidly rotating forks and thrown for a considerable distance rearwardly thereby, of course being distributed over a stretch of ground of comparatively great width in order that the wagon will have to traverse the field but few times in performing its spreading function.

In Fig. 4, a construction is shown which corresponds in principle to that shown in Figs. 1 to 3 inclusive. In said figure only one of the distributing shafts with its arms and forks is shown, the other being replaced by a guide 22, which guide may be a solid plate of substantially the same height as shaft 8, or it may be a skeleton guide, any type being satisfactory which will hold the mass of straw within the range of movement of the forks. In this construction the action will be practically the same as in the construction where the two coöperating sets of forks are employed, but the straw will not be spread over as wide a path and for this reason it will be necessary for the wagon equipped with the construction shown in Fig. 4 to traverse a field a greater number of times than would be necessary with the attachment shown in Figs. 1 and 3. When traveling to and from the field, it is desirable, that the forks shall remain stationary and for this reason a spring catch 23 projects from frame 1 for engagement by the lever when swung inward to disengage the clutch members.

From the above description it will be apparent that I have produced a straw spreader embodying the features enumerated as desirable in the statement of the object of the invention, and I wish it to be understood that while I have illustrated and described the prefered embodiment of the invention I do not desire to be restricted to the exact details of construction shown and described as obvious modifications will suggest themselves to one skilled in the art.

I claim:

The combination with a wheeled vehicle, of a frame consisting of a plurality of transverse bars, one fitting against the rear end of the vehicle body, and a plurality of longitudinally extending bars connecting said transverse bars and extending forwardly into and resting on the bottom of the vehicle body, means for securing said longitudinal bars to the bottom of the vehicle body, a transverse shaft suitably journaled between said transverse bars, gearing connecting said shaft with one of the wheels of the vehicle, means to throw the shaft into or out of gear with said vehicle wheel, a pair of vertical shafts suitably journaled, bevel gear wheels connecting said shafts with the first-named shaft, and arms secured to the vertical shafts and forks secured to the outer ends of said arms.

In testimony whereof I affix my signature in the presence of two witnesses.

JAMES H. MOTT.

Witnesses:
HELEN C. RODGERS,
G. Y. THORPE.

---

Copies of this patent may be obtained for five cents each, by addressing the "Commissioner of Patents, Washington, D. C."